United States Patent
Tsu et al.

(10) Patent No.: US 8,458,370 B1
(45) Date of Patent: Jun. 4, 2013

(54) METHOD AND SYSTEM FOR SUPPORTING MULTIPLE DISPLAY INTERFACE STANDARDS

(75) Inventors: William P. Tsu, San Jose, CA (US); Luc R. Bisson, San Jose, CA (US); Vishal Lulla, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1173 days.

(21) Appl. No.: 11/951,286

(22) Filed: Dec. 5, 2007

(51) Int. Cl.
*G06F 3/00* (2006.01)
*H04J 3/16* (2006.01)

(52) U.S. Cl.
USPC .............................................. 710/8; 370/465

(58) Field of Classification Search
USPC .............................................. 710/8; 370/465
See application file for complete search history.

(56) References Cited

U.S. PATENT DOCUMENTS

| | | | |
|---|---|---|---|
| 6,493,351 B1 * | 12/2002 | Shideler | 370/438 |
| 7,124,292 B2 * | 10/2006 | Smyers | 713/2 |
| 2005/0162336 A1 * | 7/2005 | McClintock et al. | 345/1.1 |
| 2006/0109861 A1 * | 5/2006 | Tsao | 370/465 |
| 2006/0190646 A1 * | 8/2006 | Feng et al. | 710/100 |

OTHER PUBLICATIONS

Definition of 'boot', 2003, Wiley Publishing, Inc.*
Definition of 'DIP switch', 2003, Wiley, Publishing, Inc.*

* cited by examiner

*Primary Examiner* — Hyun Nam
(74) *Attorney, Agent, or Firm* — Patterson & Sheridan, LLP

(57) ABSTRACT

A method and system for supporting multiple display interface standards are disclosed. Specifically, one embodiment of the present invention sets forth a computing device, which includes a processing unit and a display interface. The display interface further includes a formatting logic and a set of output pins, wherein the formatting logic is configured to derive a first set of output signals conforming to a first display interface standard from a data stream, drive the first set of output signals via a set of output pins to a first display device supporting the first display interface standard, support a second display interface standard instead of the first display interface standard in response to a state change and derive the first set of output signals conforming to the second display interface standard, and drive the first set of output signals via the same set of output pins to a second display device supporting the second display interface standard.

20 Claims, 7 Drawing Sheets

METHOD AND SYSTEM FOR SUPPORTING MULTIPLE DISPLAY INTERFACE STANDARDS

BACKGROUND OF THE INVENTION

1. Field of the Invention

The present invention generally relates to display interfaces, and more particularly to a method and system for supporting multiple display interface standards.

2. Description of the Related Art

Unless otherwise indicated herein, the approaches described in this section are not prior art to the claims in this application and are not admitted to be prior art by inclusion in this section.

A display interface is a communication link that connects a display device with an image source system from which the display device receives data signals for image display. The function of the display interface is to convert data streams provided by the image source system into a suitable format for transmission to the display device. As image processing and display technologies continue to advance to support displaying increasingly higher display resolutions from various image source systems, such as computers, games consoles, DVD players, set top boxes, and others, a suite of specifications for the display interface have also been developed and standardized. To ensure compatibility to various types of display devices in the marketplace, the image source system needs to support multiple display interface standards.

FIG. 1 illustrates a conventional approach in the design of an image source system that supports multiple display interface standards. An image source system 100, for example a computer system, has a display interface unit 110 that includes separate sets of output pins 114, 118 and 122, each of which is dedicated to transmit display output signals adhering to a specific specification. Some examples of the specification include the Low Voltage Differential Signaling (LVDS) standard, the Digital Visual Interface (DVI) standard, and the High Definition Multimedia Interface (HDMI) standard. The image source system 100 includes distinct functional units, such as a LVDS logic unit 112, a DVI logic unit 116, and a HDMI logic unit 120, that convert data streams into output signals of conforming to the LVDS, DVI, and HDMI standards, respectively. Each of these functional units is coupled to a set of corresponding output pins 114, 118, or 122 through a separate and pre-wired circuit path. In other words, the display interface unit 110 supports different display interface standards by physically including multiple sets of functional units that perform the necessary data format conversions and also the corresponding sets of output pins to connect with different types of a display device 124.

Despite of its ability to support multiple display interface standards, the prior art system shown in FIG. 1 has a number of disadvantages. One, to support just three display interface standards, the display interface 110 of the image source system 100 already has to include three sets of the output pins 114, 118 and 122, which not only increases the total pin count for the display interface but also adds wiring complexity and renders the display interface less power-efficient. Two, the inflexibility of the prior art system is further exposed whenever a new display interface standard is proposed and adopted, since the display interface 110 needs to be redesigned to accommodate the new standard.

As the foregoing illustrates, what is needed in the art is thus a method and system that can flexibly and efficiently support multiple display interface standards and address at least the problems set forth above.

SUMMARY OF THE INVENTION

A method and system for supporting multiple display interface standards are disclosed. Specifically, one embodiment of the present invention sets forth a computing device, which includes a processing unit and a display interface. The display interface further includes a formatting logic and a set of output pins, wherein the formatting logic is configured to derive a first set of output signals conforming to a first display interface standard from a data stream, drive the first set of output signals via a set of output pins to a first display device supporting the first display interface standard, support a second display interface standard instead of the first display interface standard in response to a state change and derive the first set of output signals conforming to the second display interface standard, and drive the first set of output signals via the same set of output pins to a second display device supporting the second display interface standard.

At least one advantage of the present invention disclosed herein is the ability to generate and transmit output signals of different interface formats through the same output pins, so that the overall pin count can stay constant even as more and more display interface standards are supported. The wiring for such a display interface is thus simplified, rendering this display interface more flexible and power-efficient.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Throughout this disclosure, the term "image source system" broadly refers to a system or device that generates and/or processes image and video data for display. Some examples of the image source system includes, without limitation, a computer system, a set top box, a games console, and media playback devices. In addition, the term "display device" may be any types of display monitors such as liquid crystal displays, cathode-ray-tube displays, plasma displays, or any other suitable display systems. The term "display interface" broadly refers to a digital display interface or an analog display interface. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Figure 1:
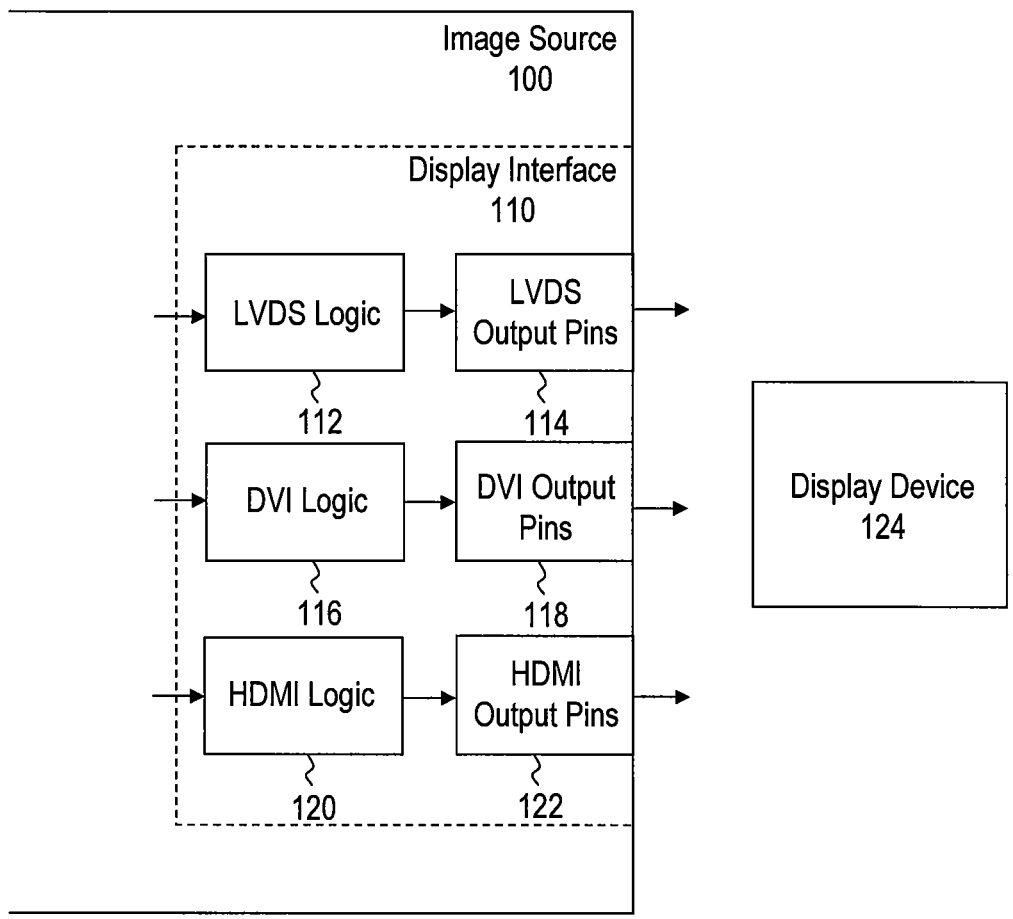
FIG. 1 illustrates a conventional approach in the design of an image source system that supports multiple display interface standards.
Figure 2A:
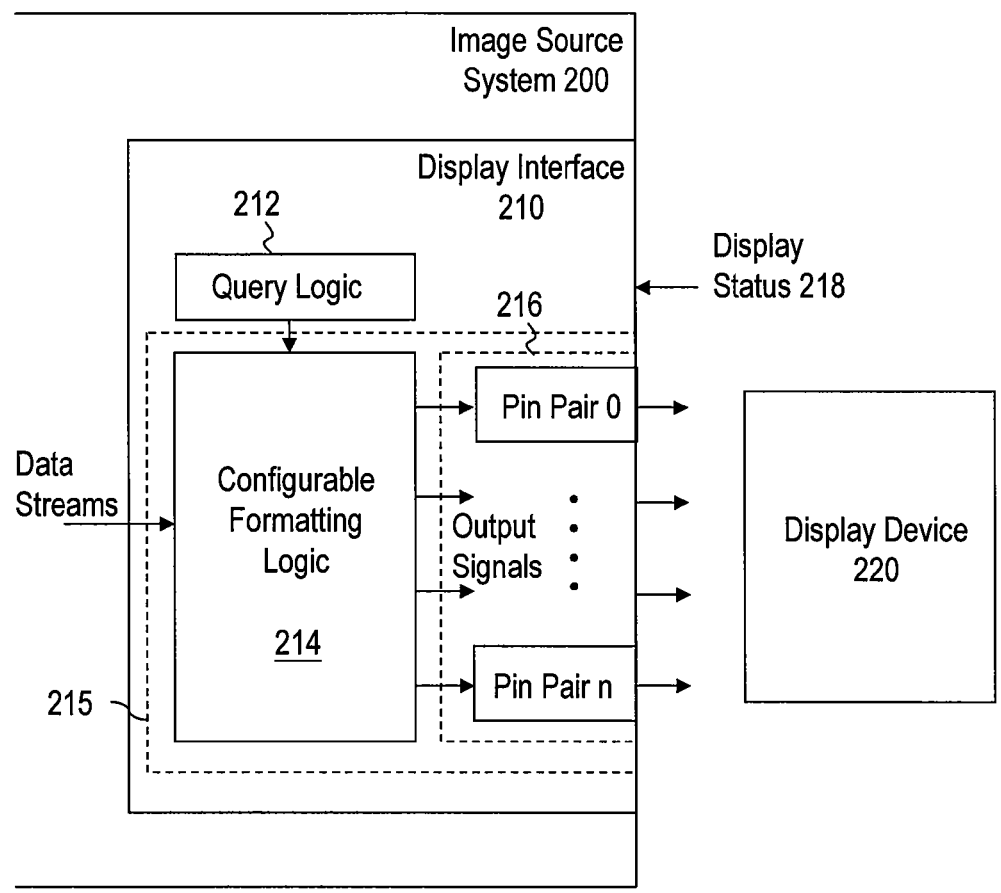
FIG. 2A is a conceptual diagram of a configurable display interface, according to one or more aspects of the present invention.

FIG. 2A is a conceptual diagram of a configurable display interface unit 210 according to one or more aspects of the present invention. The display interface unit 210 is used to link an image source system 200 with a display device 220. The display interface unit 210 includes a query logic circuit 212 and a configurable block 215, which further includes a configurable formatting logic circuit 214 and a plurality of output pins 216. The output pins 216 may be arranged into n pairs (i.e., pair 0~pair n), each is assigned to output a signal such as a clock and synchronization signal, color (e.g., red, green and blue) data, audio data, and any other signal necessary for properly displaying image on the display device 220. It is worth noting as long as the display device 220 adopts one of the multiple display interface standards supported by the display interface unit 210, then the output pins 216 are designed to mechanically fit the connector of that display device 220. In other words, if the display interface unit 210 supports the Digital Visual Interface (DVI) standard, the High Definition Multimedia Interface (HDMI) standard, the Low Voltage Differential Signaling (LVDS), and the Display Port (DP) standard, then the output pins 216 are designed to connect with a DVI connector, a HDMI connector, a LVDS connector, or a DP connector of the display device 220 without any additional efforts to redesign the display interface unit 210.

Furthermore, the formatting logic circuit 214 is configurable to convert data streams provided by the image source system 200 into output signals conforming to different display interface standards for transmission through the output pins 216. In one implementation, these display interface standards supported by the formatting logic circuit 214 include, without limitation, the aforementioned DVI, HDMI, LVDS, and DP standards. The query logic 212, based on a received status signal 218, may cause the configurable formatting logic 214 to select among these multiple standards and configure the output pins 216 to support one or more selected display interface standard. More specifically, the received display status 218 generally conveys information related to the capabilities of a display device, such as the display device 220. The display status 218 can be a set of data pre-stored in the display device 220, such as the Extended Display Identification Data (EDID), which is queried through a side band channel by the query logic circuit 212. A device driver installed on the image source system 200 can be responsible for signaling the query logic circuit 212 to initiate such queries. In an alternative implementation, the display status 218 can be a set of pre-defined data stored in read-only memory (ROM) or flash memory that are retrieved by the firmware code of the image source system 200, such as the Basic Input/Output System (BIOS), to configure the display interface unit 210 as the image source system 200 boots up. In one implementation, a hot plug pin supported by the display device 220 triggers a connect event or a disconnect event. In response to the event, the display status 218 is transmitted. Here, the query logic circuit 212 does not need to query the display device 220. According to yet another implementation, the image source system 200 may be equipped with a mechanical switch, which if switched on, triggers the loading of the display status 218 stored in ROM or flash memory of the image source system 200.

As has been demonstrated, because the same output pins 216 are used to transmit signals and accept connectors that adhere to different display interface standards, the circuit wiring of the display interface unit 210 is simplified, which makes the display interface unit 210 more flexible and power-efficient. Also, for any proposed or adopted standard that is still evolving or is more complex, such as the DP standard, the configurability of the display interface unit 210 facilitates a speedy and robust implementation of the standard.

Figure 2B:
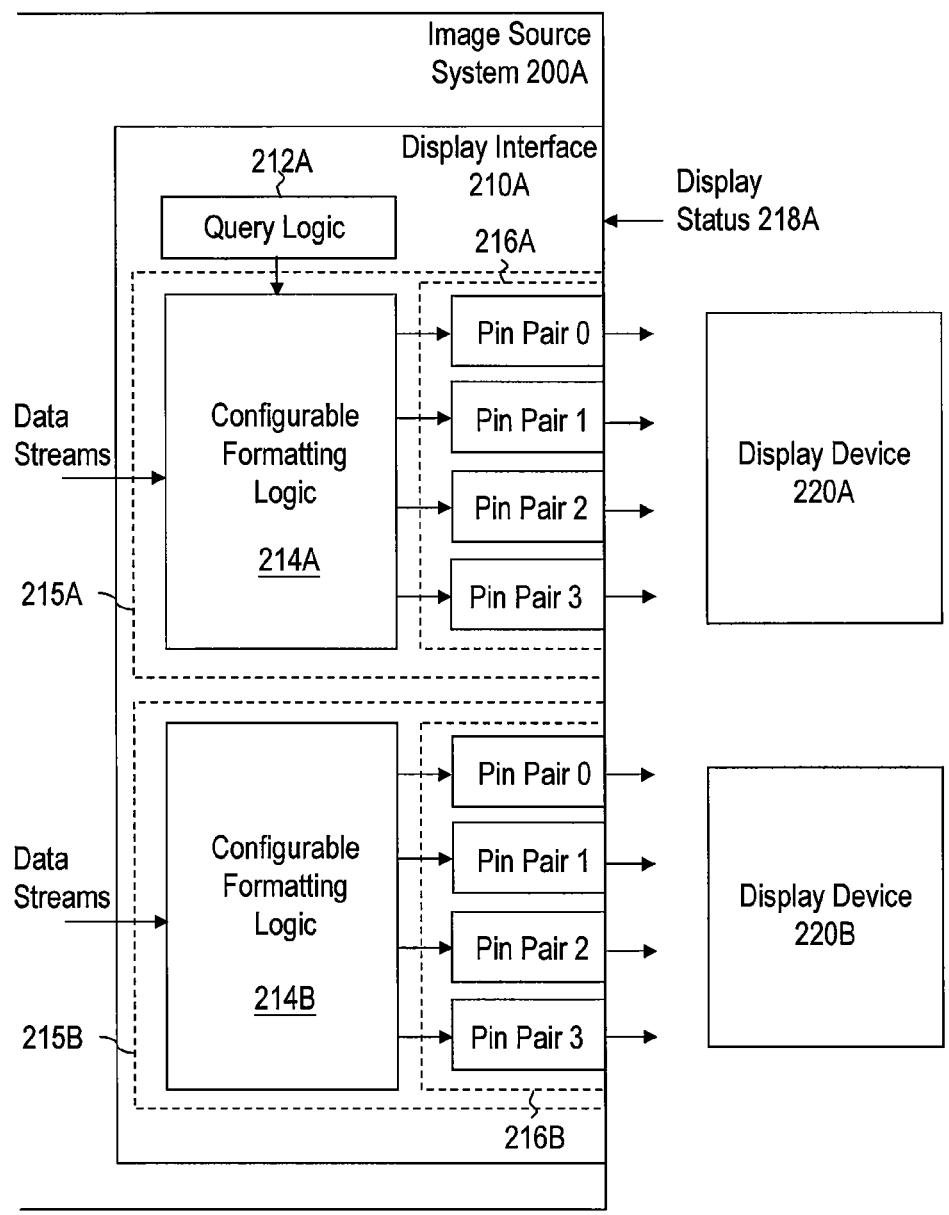
FIG. 2B is a conceptual diagram of a configurable display interface supporting single display or dual independent display modes, according to another embodiment of the present invention.
Figure 2C:
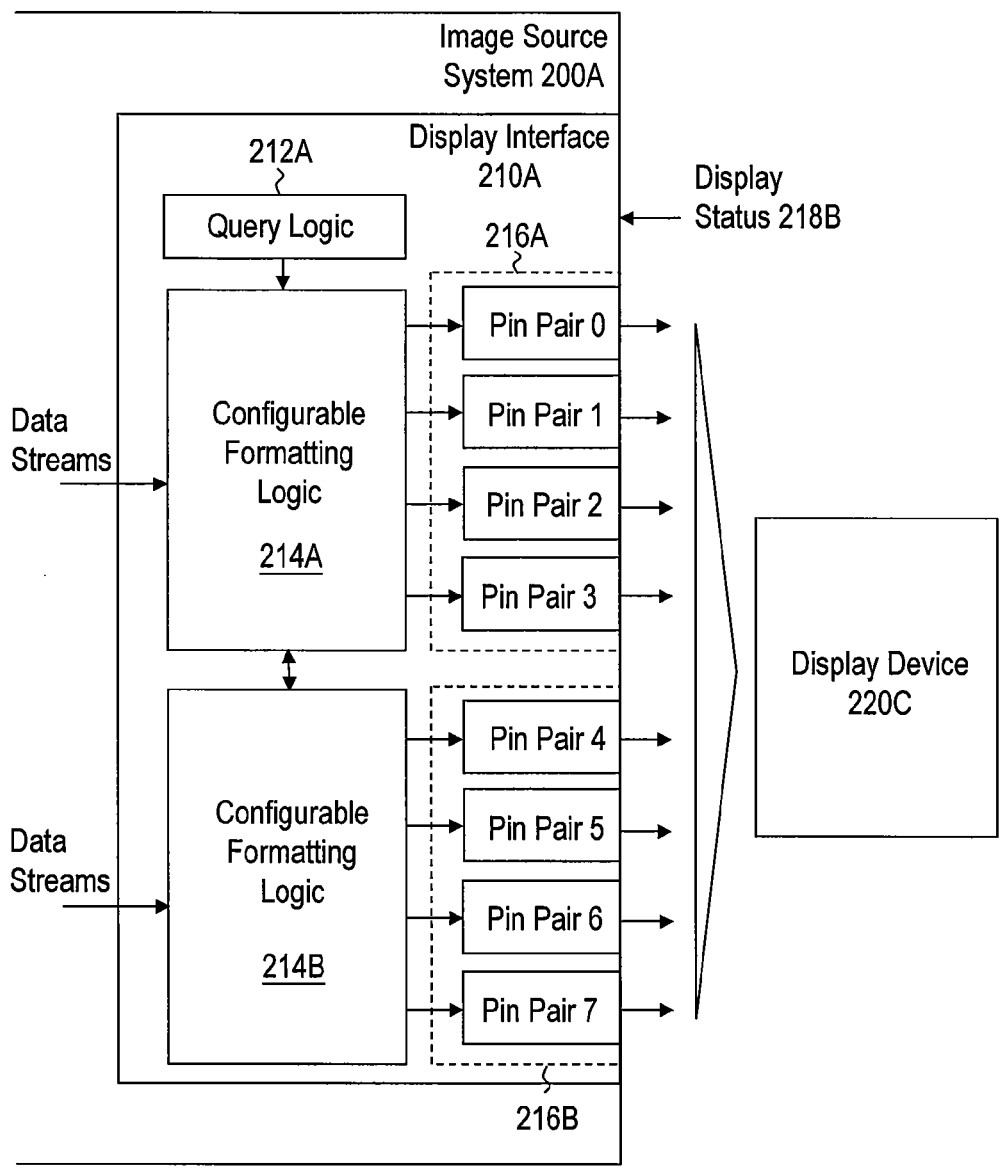
FIG. 2C is a conceptual diagram of a configurable display interface supporting a dual link mode, according to yet another embodiment of the present invention.

FIGS. 2B and 2C illustrate additional implementations of the display interface unit 210 shown in FIG. 2A that are configurable to link an image source system 200A with one or more display devices supporting different display interface standards. In particular, a display interface unit 210A in FIG. 2B includes a query logic circuit 212 and two configurable blocks 215A and 215B. Each of two sets of output pins 216A and 216B supports four pin pairs, pin pair 0-pin pair 3. Like the formatting logic circuit 214 shown in FIG. 2A, each of the formatting logic circuits 214A and 214B in the configurable blocks 215A and 215B, respectively, can be configured to support a different display interface standard and operate independently and compatibly with the a connected display device 220A or a connected display device 220B. Specifically, the formatting logic circuit 214A, independently from the formatting logic circuit 214B, drives the properly formatted signals via the output pins 216A to the display device 220A. Likewise, the formatting logic circuit 214B drives the signals via the output pins 216B to the display device 220B. Each of the connections to the display device 220A and the display device 220B shown in FIG. 2B is referred to as a "single link," and such an operating mode is referred to as a single display mode. If both of the single links are active and transmitting data to the display devices, then these single links are also referred to as a "dual independent single-link," and such an operating mode is referred to as a dual independent display mode.

To illustrate the mechanism for retrieving and utilizing a display status 218A, which is similar to the display status 218 detailed above, suppose the display status 218A indicates that a single-link and the DVI standard implementation for both of the display devices 220A and 220B is desired. Based on such a display status 218A, each of the formatting logic circuits 214A and 214B is configured to support the DVI standard. In addition, in support of the dual independent single-link mode, each of the formatting logic circuits 214A and 214B is also configured to independently convert the data streams provided by the image source system 200A to a set of output signals conforming to the DVI standard. Each set of the DVI-formatted output signals is then independently transmitted through either the output pins 216A or the output pins 216B to either the display device 220A or the display device 220B, respectively.

Unlike the single link implementation described above, a "dual link" implementation generally refers to synchronizing the outputs of both the configurable formatting logic 214A and 214B shown in FIG. 2C to drive data to a single connected display device 220C. To illustrate, suppose a display status 218B indicates a dual-link and the DVI standard implementation for the display device 220C is desired. Similar to the discussions of FIG. 2B above, the formatting logic circuits 214A and 214B of FIG. 2C are also configured to convert data streams to output signals that conform to the DVI standard. In addition, the DVI-formatted output signals are also synchronized here to be driven through both sets of the output pins 216A and 216B in the dual link mode. To synchronize the output signals in the dual link mode, one of the formatting logic circuits 214A and 214B may be configured as the master and the other as the slave. Also, each of the formatting logic circuits 214A and 214B may be configured to transmit either odd or even lines of an image.

Table 1 below lists some usage scenarios supported by one of the aforementioned display interfaces, according to one embodiment of the present invention. A person skilled in the art will readily appreciate that the list of Table 1 is not exhaustive and other combinations or formats may be possible.

TABLE 1

| Block Conf. | Pair 0 | Pair 1 | Pair 2 | Pair 3 | Pair 4 | Pair 5 | Pair 6 | Pair 7 |
|---|---|---|---|---|---|---|---|---|
| Single-link DVI | Data A | Data A | Data A | Clk A | Not Used | Not Used | Not Used | Not Used |
| Dual-link DVI/HDMI | Even | Even | Even | Clk | Odd | Odd | Odd | Not Used |
| Dual independent single-link DVI/HDMI (A&B) | Data A | Data A | Data A | Clk A | Data B | Data B | Data B | Clk B |
| Display Port | Lane0-A | Lane1-A | Lane2-A | Lane3-A | | | | |
| Dual independent Display Port (A&B) | Lane0-A | Lane-A | Lane2-A | Lane3-A | Lane0-B | Lane1-B | Lane2-B | Lane3-B |

Figure 2D:
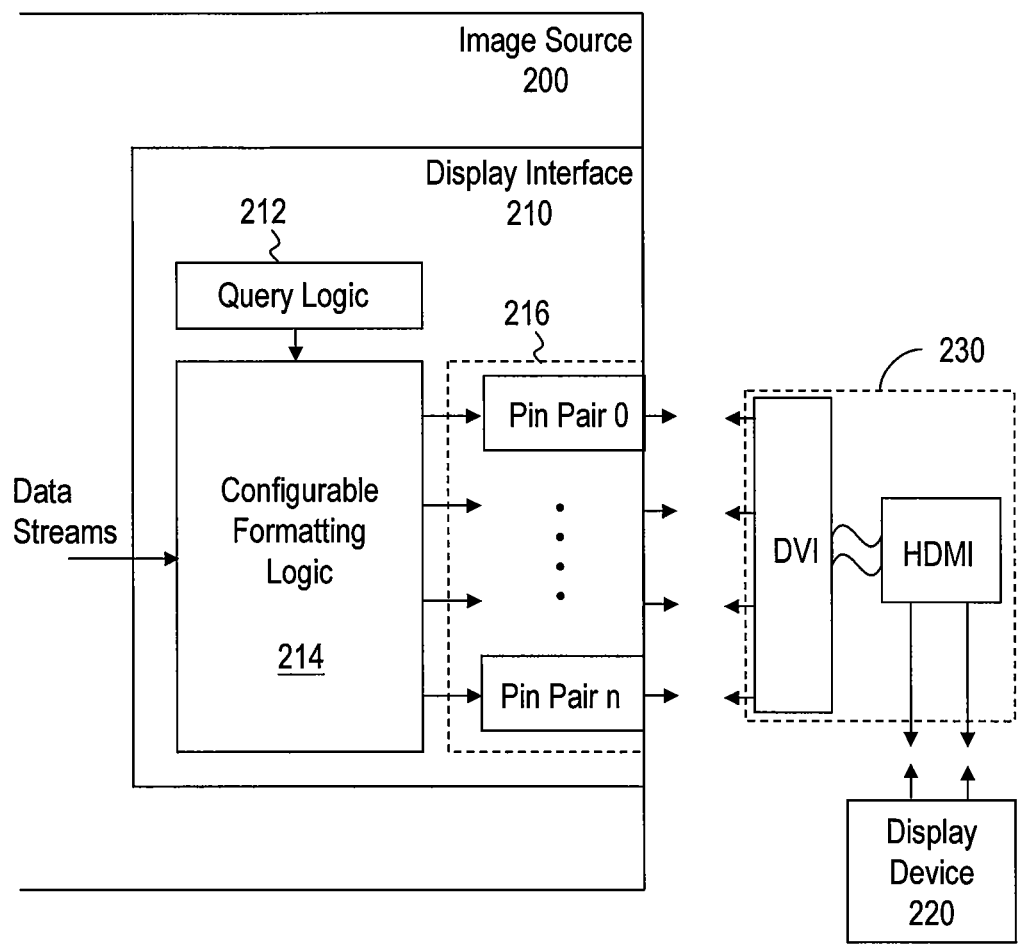
FIG. 2D illustrates one advantageous feature of the configurable display interface unit shown in FIG. 2A, according to another embodiment of the present invention.

FIG. 2D illustrates one advantageous feature of the configurable display interface unit 210 shown in FIG. 2A, according to another embodiment of the present invention. Because the display interface unit 210 can be flexibly configured to support various display interface standards, even if the physical configuration of the output pins 216 do not match the connector for the display device 220, an adapter 230, also referred to as a "dongle", can be added to still ensure compatibility between the image source system 200 and the display device 220. For example, suppose the physical configuration of the output pins 216 corresponds to a DVI connector, and the connector for the display device 220 is a HDMI connector. One implementation of the adapter 230 supports the DVI connector on one end, and the HDMI connector on the other end, as illustrated in the example of FIG. 2D.

Figure 3:
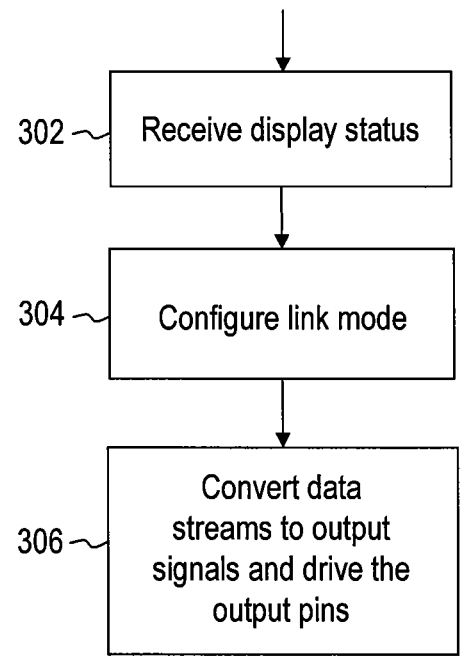
FIG. 3 is a flowchart illustrating the method steps for establishing a communication link between an image source and a display device through a configurable display interface unit, according to one embodiment of the present invention.

In conjunction with FIG. 2A, FIG. 3 is a flowchart illustrating the method steps for establishing a communication link between an image source and a display device through a configurable display interface unit, according to one embodiment of the present invention. In an initial step 302, the display interface unit 210 shown in FIG. 2A receives the display status 218 indicative of the capabilities of the display device 220. Various mechanisms for obtaining the display status 218 have been detailed above. In step 304, based on the display status 218, the formatting logic circuits 214A and 214B are configured to drive certain output signals in a single link mode, a dual link mode, or any one of the use scenarios listed in Table 1. In step 306, the formatting logic circuits 214A and 214B convert the data streams provided by the image source system 200 into the output signals conforming to specific display interface standards and begin driving the output signals through the output pins 216. It should be apparent to a person with ordinary skills in the art to recognize that the method steps of FIG. 3 can be performed in a different sequence or further divided or combined without exceeding the scope of the claimed invention.

Figure 4:
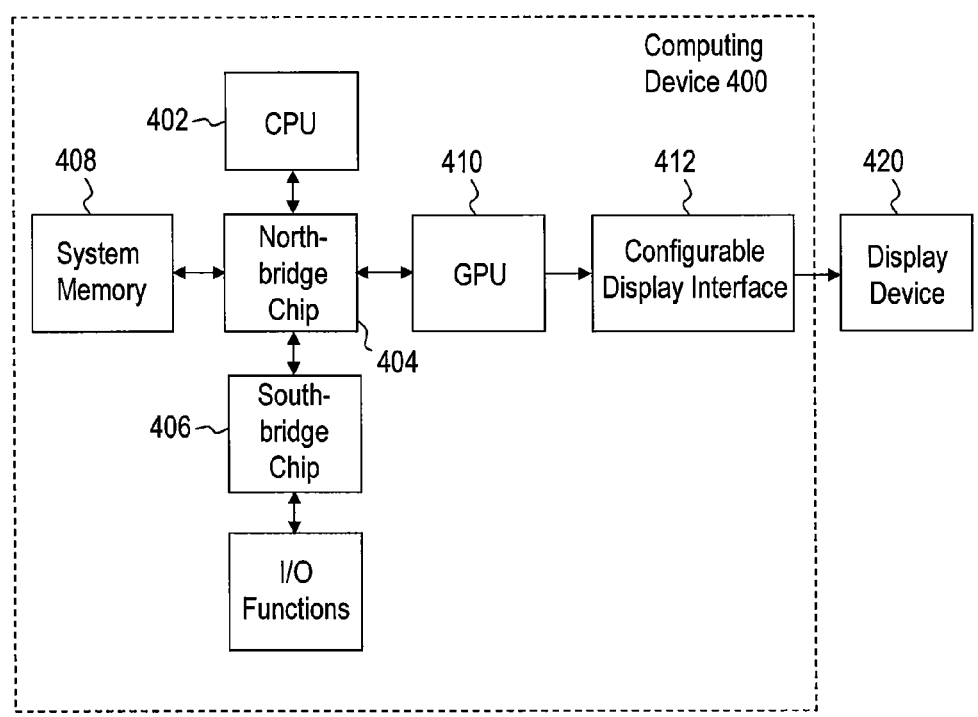
FIG. 4 is a conceptual diagram of a computing device configured to implement one or more aspects of the present invention.

FIG. 4 is a conceptual diagram of a computing device configured to implement one or more aspects of the present invention. Computing device 400 includes a central processor unit (CPU) 402, a Northbridge chip 404, a Southbridge chip 406, system memory 408, a graphics processor unit (GPU) 410, and a configurable display interface 412 through which the computing device 400 is linked with a display device 420. Alternatively, the display interface 412 can be included in the GPU 410.

The CPU 402 connects to system memory 408 and GPU 410 via the Northbridge chip 404, which may be a memory controller hub. In particular, the CPU 402 executes programming instructions stored in the system memory 408, operates on data stored in the system memory 408, and communicates with the GPU 410 through the Northbridge chip 404. The system memory 408 typically includes dynamic random access memory (DRAM). The Southbridge chip 406, which may be an input/output (I/O) controller hub, is dedicated to handle I/O functions, such as Universal Serial Bus (USB), Industry Standard Architecture (ISA) bus, interrupt controller, and similar I/O functions. The GPU 410 processes the instructions that may come from the CPU 402 in order to render graphics data and images to be transmitted through the configurable display interface 412 to the display device 420. In alternate embodiments, the Northbridge chip 404, the Southbridge chip 406, the GPU 410, or any combinations thereof, may be integrated into a single processing unit. Further, the functionality of the GPU 410 may be included in a chipset or in some other type of special purpose processing unit or co-processor. The display device 420 is an external device to the computing device 400 capable of emitting a visual image based on data signals received through display interface 412. The display interface 412 is configurable so that output signals can be transmitted through a same set of output pins of the display interface 412 according to different display interface standards.

The above description illustrates various embodiments of the present invention along with examples of how aspects of the present invention may be implemented. It should be apparent to a person with ordinary skills in the art to recognize that the present invention can be scaled to support multiple display devices. The above examples, embodiments, instruction semantics, and drawings should not be deemed to be the only embodiments, and are presented to illustrate the flexibility and advantages of the present invention as defined by the following claims.

We claim:

1. A method for supporting multiple display interface standards, the method comprises:
    configuring a formatting logic to derive a first set of output signals conforming to a first display interface standard from a data stream;
    driving the first set of output signals via a set of output pins to a first display device supporting the first display interface standard;
    configuring the same formatting logic to support a second display interface standard instead of the first display interface standard in response to a state change conveying information related to capabilities of a second display device and to derive the first set of output signals conforming to the second display interface standard; and
    driving the first set of output signals via the same set of output pins to the second display device supporting the second display interface standard.

2. The method of claim 1, further comprising querying the second display device for the capability information.

3. The method of claim 1, further comprising accessing pre-stored data associated with the capability information during a bootup process.

4. The method of claim 1, further comprising accessing pre-stored data associated with the capability information by toggling a mechanical switch.

5. The method of claim 1, further comprising attaching one side of a dongle supporting the first display interface standard to the set of output pins and the other side of the dongle supporting the second display interface standard to a connector of the second display device.

6. A method for supporting multiple display interface standards, the method comprises:
    configuring a formatting logic to derive a first set of output signals conforming to a first display interface standard from a data stream;
    driving the first set of output signals via a set of output pins to a first display device supporting the first display interface standard;
    configuring the same formatting logic to support a second display interface standard instead of the first display interface standard in response to a state change conveying information related to capabilities of a second display device and to derive the first set of output signals conforming to the second display interface standard;
    driving the first set of output signals via the same set of output pins to the second display device supporting the second display interface standard;
    operating two copies of the formatting logic in parallel, wherein a first copy independently derives the first set of output signals conforming to the first display interface standard from a data stream for the first display device; and
    driving the first set of output signals in a single display mode to the first display device via a first subset of the set of output pins.

7. The method of claim 6, further comprising:
    independently deriving a second set of output signals conforming to a third display interface standard from a data stream for a third display device by a second copy of the formatting logic; and
    driving the second set of output signals in the single display mode to the third display device via a second subset of the set of output pins in parallel with the driving of the first set of output signals.

8. The method of claim 1, further comprising:
    operating two copies of the formatting logic in parallel, wherein a first copy independently derives the first set of output signals conforming to the first display interface standard from a data stream for the first display device, and a second copy independently derives a second set of output signals still conforming to the first display interface standard from a data stream for the first display device; and
    synchronizing between the first set of output signals and the second set of output signals in a dual independent display mode prior to transmitting output signals to the first display device.

9. A computing device for supporting multiple display interface standards, the computing device comprises:
    a processing unit; and
    a display interface further including a formatting logic and a set of output pins, wherein the formatting logic is configured to:
        derive a first set of output signals conforming to a first display interface standard from a data stream;
        drive the first set of output signals via a set of output pins to a first display device supporting the first display interface standard;
        support a second display interface standard instead of the first display interface standard in response to a state change conveying information related to capabilities of a second display device and to derive the first set of output signals conforming to the second display interface standard; and
        drive the first set of output signals via the same set of output pins to the second display device supporting the second display interface standard.

10. The computing device of claim 9, further including a query logic to query the second display device for the capability information.

11. The computing device of claim 9, further including a query logic to access pre-stored data associated with the capability information during a bootup process.

12. The computing device of claim 9, further including a query logic to access pre-stored data associated with the capability information in response to the toggling a mechanical switch.

13. The computing device of claim 9, wherein the display interface supports the attachment of one side of a dongle supporting the first display interface standard to the set of output pins and the other side of the dongle supporting the second display interface standard to a connector of the second display device.

14. A computing device for supporting multiple display interface standards, the computing device comprises:
    a processing unit; and
    a display interface further including a formatting logic and a set of output pins, wherein the formatting logic is configured to:
        derive a first set of output signals conforming to a first display interface standard from a data stream;

drive the first set of output signals via a set of output pins to a first display device supporting the first display interface standard;

support a second display interface standard instead of the first display interface standard in response to a state change conveying information related to capabilities of a second display device and to derive the first set of output signals conforming to the second display interface standard; and drive the first set of output signals via the same set of output pins to the second display device supporting the second display interface standard;

a second copy of the formatting logic, wherein a first copy and the second copy of the formatting logic are configured to operate in parallel and the first copy is further configured to:

independently derive the first set of output signals conforming to the first display interface standard from a data stream for the first display device, and drive the first set of output signals in a single display mode to the first display device via a first subset of the set of output pins.

15. The computing device of claim 14, wherein the second copy is further configured to:

independently derive a second set of output signals conforming to a third display interface standard from a data stream for a third display device; and driving the second set of output signals in the single display mode to the third display device via a second subset of the set of output pins in parallel with the driving of the first set of output signals by the first copy.

16. The computing device of claim 9, further comprising:

a second copy of the formatting logic, wherein a first copy and the second copy of the formatting logic are configured to:

operate in parallel;

independently derive the first set of output signals conforming to the first display interface standard from a data stream for the first display device by the first copy;

independently derive a second set of output signals still conforming to the first display interface standard from a data stream for the first display device by the second copy; and synchronize between the first set of output signals and the second set of output signals in a dual independent display mode prior to transmitting output signals to the first display device.

17. A non-transitory computer-readable medium containing a sequence of instructions, which when executed by a formatting logic in a display interface, causes the formatting logic to:

derive a first set of output signals conforming to a first display interface standard from a data stream;

drive the first set of output signals via a set of output pins to a first display device supporting the first display interface standard;

support a second display interface standard instead of the first display interface standard in response to a state change conveying information related to capabilities of a second display device and to derive the first set of output signals conforming to the second display interface standard; and drive the first set of output signals via the same set of output pins to the second display device supporting the second display interface standard.

18. A non-transitory computer-readable medium containing a sequence of instructions, which when executed by a formatting logic in a display interface, causes the formatting logic to:

derive a first set of output signals conforming to a first display interface standard from a data stream;

drive the first set of output signals via a set of output pins to a first display device supporting the first display interface standard;

support a second display interface standard instead of the first display interface standard in response to a state change conveying information related to capabilities of a second display device and to derive the first set of output signals conforming to the second display interface standard; and drive the first set of output signals via the same set of output pins to the second display device supporting the second display interface standard, wherein the computer-readable medium further containing a sequence of instructions, which when executed by two copies of the formatting logic in the display interface, causes a first copy to:

independently derive the first set of output signals conforming to the first display interface standard from a data stream for the first display device; and drive the first set of output signals in a single display mode to the first display device via a first subset of the set of output pins.

19. The non-transitory computer-readable medium of claim 18, further containing a sequence of instructions, which when executed by the two copies of the formatting logic in the display interface, causes a second copy to:

independently derive a second set of output signals conforming to a third display interface standard from a data stream for a third display device; and drive the second set of output signals in the single display mode to the third display device via a second subset of the set of output pins in parallel with the driving of the first set of output signals by the first copy.

20. The non-transitory computer-readable medium of claim 17, further containing a sequence of instructions, which when executed by two copies of the formatting logic in the display interface, causes a first copy and a second copy to:

operate in parallel;

independently derive the first set of output signals conforming to the first display interface standard from a data stream for the first display device by the first copy;

independently derive a second set of output signals still conforming to the first display interface standard from a data stream for the first display device by the second copy; and synchronize between the first set of output signals and the second set of output signals in a dual independent display mode prior to transmitting output signals to the first display device.

* * * * *